May 9, 1961 F. F. DAUENHAUER 2,983,380
METHOD AND EQUIPMENT FOR SEPARATING
HOPS FROM FOREIGN MATERIAL
Filed July 8, 1957 3 Sheets-Sheet 1
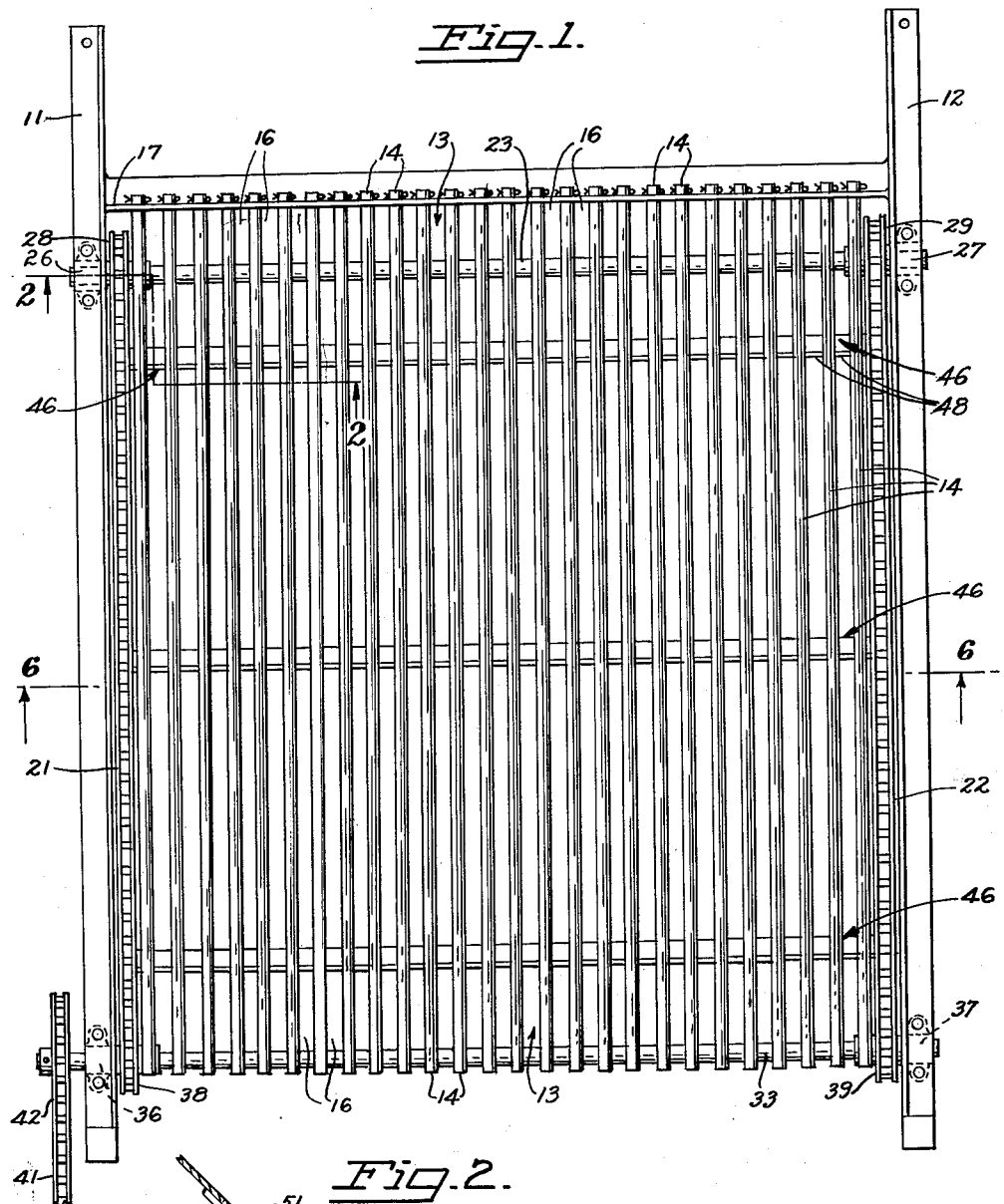
INVENTOR.
FLORIAN F. DAUENHAUER
BY
HIS ATTORNEY.

May 9, 1961 F. F. DAUENHAUER 2,983,380
METHOD AND EQUIPMENT FOR SEPARATING
HOPS FROM FOREIGN MATERIAL
Filed July 8, 1957 3 Sheets-Sheet 2
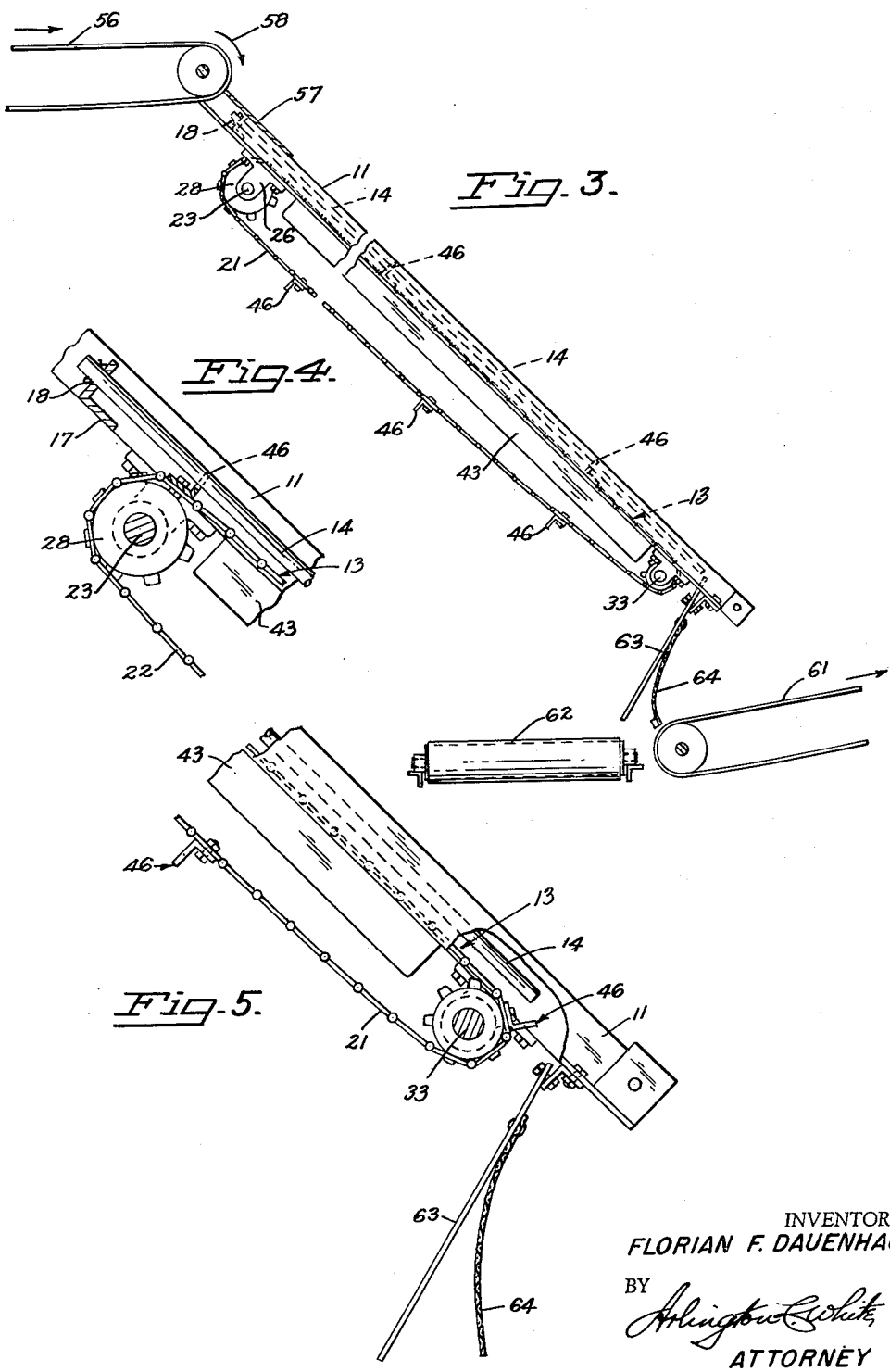
INVENTOR.
FLORIAN F. DAUENHAUER
BY
ATTORNEY

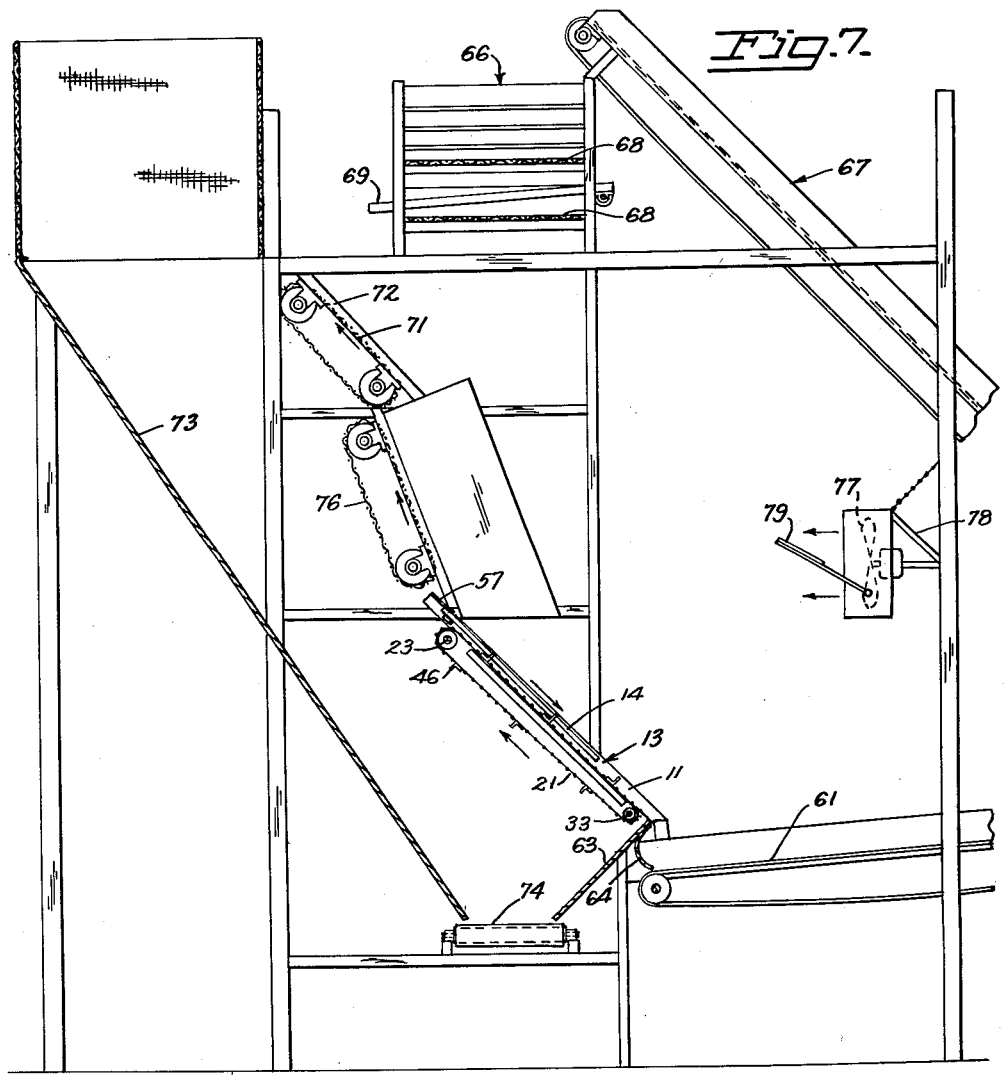
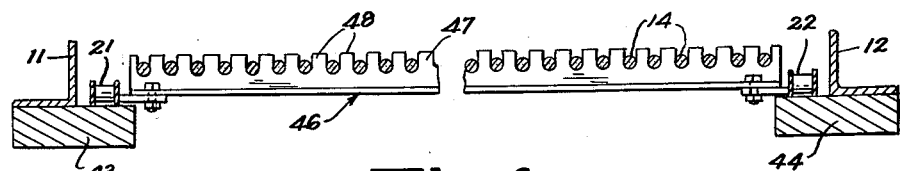

United States Patent Office 2,983,380
Patented May 9, 1961

2,983,380
METHOD AND EQUIPMENT FOR SEPARATING HOPS FROM FOREIGN MATERIAL
Florian F. Dauenhauer, 1860 Lomitas Ave., Santa Rosa, Calif.
Filed July 8, 1957, Ser. No. 670,567
4 Claims. (Cl. 209—320)

The invention, in general, relates to the art of machine picking of hops. More particularly, the invention relates to an improved method and improved equipment which are adaptable to any type of hop-picking machine, for obtaining a greater separation of stripped hops from intermingled foreign matter to the end that premium hops are attained.

As is perhaps well known, in the operation of all machines for stripping hops from hop vines there is a considerable quantity of foreign material including vine fragments, leaves and leaf fragments as well as long and short stems, which is inevitably intermingled with the stripped hops. It has been an ever present problem in the art to eliminate such foreign material from picked hops and, as an incentive to the solution of such problem, brewers now offer increased prices for cleaned hops, measured by the reduced percentage of foreign material in a given quantity of hops; such cleaner hops being known in the art as "premium" hops.

Heretofore, there have been developed and there are being used a variety of different types of hop separating devices and methods of hop separation. Many of these prior devices are disadvantageous because of their bulk and, therefore, they cannot be used due to space limitations. Other separating devices are only fairly effective in performance, and these machines have been used in a recycling operation by feeding back the mixtures of hops and foreign material through the devices in an endeavor to attain as clean hops as possible. This recycling or feed-back of the mixtures is costly because of the necessity of providing elevators or other flight conveyors which again require additional space. Moreover, such separating methods of feeding back or recycling the material are disadvantageous because the hops are damaged due to the increased handling thereof. The present invention is directed to the provision of an improved hop separator unit and method of separating hops from vine fragments, leaves and stems and the like, which obviates all of the disadvantages encountered in the use of other types of separators as well as encountered with the employment of prior expedients.

A primary object of my present invention is to provide improved hop separating equipment capable of reducing to a minimum the amount of foreign material in hops stripped from vines by hop stripping machines.

Another important object of the invention is to provide improved hop separating equipment of the indicated nature which is additionally characterized by its compactness, its inexpensive manufacturing cost as well as its inexpensive maintenance.

A still further object of the present invention is to provide improved hop separating equipment of the aforementioned character which can readily be combined with hop separating units of all types of hop stripping or hop picking machines.

Another important object of my invention is to provide an improved method of separating hops from mixtures of foreign material intermingled therewith which affords a re-current combing of mixtures of hops and foreign material while in motion continuously to break up masses of such mixtures which otherwise would occur.

A still further object of my present invention is to provide an improved method of the indicated nature which is characterized by the continuous combing of mixtures of hops and foreign materials and simultaneously separating the hops from such foreign materials and conveying them in separate paths to insure the recovery of premium hops.

Other objects of the invention, together with some of the advantageous features thereof, will appear from the following description of a preferred embodiment of the present invention as well as the preferred method of attaining the objects stated. It is to be understood, however, that I am not to be limited to the precise embodiment illustrated in the annexed drawings, nor to the precise arrangements of the various parts thereof nor to the precise mode of carrying out the improved method, as my invention, as defined in the appended claims, can be embodied in a plurality and variety of forms and can be carried out in a plurality and variety of ways.

Referring to the drawings:

Fig. 1 is a top plan view of a preferred embodiment of the invention with side shields omitted.

Fig. 2 is a fragmentary sectional view, taken on the lines 2—2 of Fig. 1.

Fig. 3 is a side elevational view of a preferred embodiment of the invention as applied to one type of a hop-picking machine, with associated delivery and take-off conveyors schematically illustrated.

Fig. 4 is an enlarged fragmentary side elevational detail of the upper portion of the preferred embodiment of the invention.

Fig. 5 is an enlarged fragmentary side elevational detail of the lower portion of the preferred embodiment of the invention.

Fig. 6 is a broken front elevational view of one of the comb elements forming a part of the preferred embodiment of the invention, this view having a detailed showing of the chain supporting member, and being taken on the line 6—6 of Fig. 1.

Fig. 7 is a side elevational view of the preferred embodiment of the invention as adapted to another type of hop-picking machine and associated with certain elements thereof.

In its preferred form, my improved equipment for separating hops from foreign material preferably comprises an inclined slotted surface upon which quantities of mixtures of hops and foreign materials are received, together with a comb structure rotatably mounted below said slotted surface, and means for rotating said comb structure to cause the teeth of the comb elements thereof recurrently to traverse the lengths of the slots in said surface whereby hops in said mixtures are freed therefrom and allowed to roll down said surface and the foreign material is permitted to drop through the slots thereof.

The preferred mode of the present invention for separating hops from foreign material preferably comprises the steps of providing an inclined slotted surface, depositing quantities of mixtures of hops and foreign material on said slotted surface, and then recurrently passing the teeth of a comb structure through the slots of said surface to free hops from said mixtures and permit the freed hops to roll down said surface and simultaneously allow the foreign material to fall through the slots of said surface.

As illustrated in Fig. 1 of the annexed drawings, I provide a suitable framework including a pair of inclined side members 11 and 12 for supporting an inclined slotted surface which is designated generally by the reference numeral 13. While the surface 13 may consist of a flat sheet formed with a plurality of slots therein arranged in parallel spaced relationship transversely of the sheet, I preferably construct inclined surface 13 from a plurality of rods 14 which may be of circular cross-section and which preferably are fabricated of steel or other strong metal; the rods 14 being arranged in parallel relationship from side to side of the framework in uniform spaced relationship to afford the slots 16 extending longitudinally of the surface 13. Any suitable mounting can be provided for the rods 14, although in the preferred embodiment illustrated I detachably secure each of the rods to a perforated cross-member 17 which spans the sides 11 and 12 and which is welded thereto; the cross-member 17 being formed with a plurality of holes therethrough for passing the rods 14 and each rod conveniently being formed, adjacent to its top, with a hole through which a cotterpin 18 or the like is projected thus affording the retention of each of the rods 14 on the cross-member 17. With this type of construction of inclined slotted surface, there is little likelihood of damage thereto and any damage to the rods can be readily obviated by the replacement of damaged rods readily.

In accordance with invention, a pair of endless chains 21 and 22 are mounted for rotation on opposite sides of the inclined slotted surface 13; the chain mounting being conventional for driving the two chains in unison. As shown, an upper shaft 23 is journaled in bearings 26 and 27 which are secured at the same level to side members 11 and 12, respectively, and upper sprocket wheels 28 and 29 are keyed or otherwise secured to the shaft 23 at opposite ends thereof. Similarly, a lower shaft 33 is journaled in bearings 36 and 37 which are secured at the same level to the sides 11 and 12, but off-set vertically with respect to the bearings 26 and 27, and lower sprocket wheels 38 and 39 are keyed or otherwise secured to the opposite ends of the lower shaft 33. The chain 21 is trained over the sprockets 28 and 38 at one side of the inclined surface 13 and the chain 22 is trained over the sprockets 29 and 39 at the opposite side of the inclined surface. The shafts 23 and 33 are driven from a common source, such as by a motor, not shown, which is conveniently placed in driving connection with the lower shaft 33 by means of a belt 41 which is trained over a pulley 42 secured to an extension of the lower shaft 33. With such driving connection, and with endless chains 21 and 22 in position on the sprockets indicated, the chains 21 and 22 can be rotated in unison in relation to the stationary rods 14 comprising the slotted inclined surface 13. The mounting of chains 21 and 22 and the drive therefor are such that the chains rotate in a clockwise direction with the upper runs thereof moving downwardly of the inclined surface 13 and in paths slightly below such inclined surface. To support the upper runs of the chains 21 and 22 and to avoid sagging of the same, I secure a pair of chain skids 43 and 44 to the framework in underlying positions with respect to the upper runs of the chains 21 and 22, respectively, thus maintaining the upper runs of the chains in close underlying proximity to the inclined slotted surface 13.

My improved hop separating equipment also includes a plurality of comb elements, designated generally by the reference numeral 46, which are caused to be moved downwardly of the inclined surface 13 and which serve to free the individual hops from the foreign material of vines, fragments of vines, hop stems, hop leaves and fragments thereof, all intermingled with the hops as quantities of mixtures of the hops and such foreign material are deposited on the inclined surface 13 adjacent to the top thereof. As shown particularly in Figs. 1, 2 and 6 of the annexed drawings, the plurality of comb elements 46 span and are secured to the chains 21 and 22 at spaced intervals throughout their lengths, and such comb elements 46 preferably are fabricated of angle irons having their upright webs 47 formed throughout their lengths with a series of teeth 48 which are uniformly spaced apart and so spaced as to be correlated with the slots between the rods 14 of the inclined surface 13. The mounting of the comb elements 46 on chains 21 and 22 is such that the toothed webs 47 of the comb elements project outwardly from the chains 21 and 22 a sufficient distance to enable the teeth 48 of the comb elements to protrude through the slots of the inclined surface 13 and to extend above the upper surface thereof.

In order to prevent lateral spilling of mixtures of hops and foreign materials from the sides of the inclined surface 13, I detachably mount a shield 51 on each side of such surface; the shields being coextensive in length with the length of the surface 13 and preferably being disposed at a lateral incline so that hops and foreign material which otherwise might escape from the surface 13 are deflected back onto the surface.

As stated above, my improved hop separating equipment is adaptable for use in any type of hop-picking machine. Preferably, my improved equipment is associated with other hop separator units and usually is associated as a final or clean-up separator handling mixtures of hops and foreign material from which a considerable amount of larger vine fragments, larger hop stems, leaves and fragments thereof have already been removed. In Fig. 3 of the annexed drawings, I have schematically illustrated my improved hop separating device in conjunction with a conveyor 56 which could be a conveyor leading from a suction type separating device and carrying the residual mixtures of hops and foreign materials after an initial hop separating operation has been completed. Or, the conveyor 56 can be the hop take-off conveyor leading from the lower ends of a series of inclined hop separator endless belts over which mixtures of hops and foreign materials have been passed to effect partial separation of the hops from the foreign material; such conveyor 56 carrying the resultant hops still containing some foreign material. With this arrangement, an inclined flat and imperforate plate 57 is conveniently mounted above and across the top of the inclined slotted surface 13 of my improved separating equipment to receive the mixtures of hops and foreign material from the end of conveyor 56, which drop therefrom as indicated by the small arrow 58, and to pass such mixtures onto the inclined slotted surface 13 where the mixtures are recurrently combed by comb elements 46 as the mixtures move down the incline. In this combing action, substantially all of the hops in the mixtures are freed therefrom and are allowed to roll down the inclined surface 13, and substantially all of the foreign material is freed by such recurrent combing action of the combs 46 from the hops and will fall through the slots 16 of the inclined surface 13.

In test runs of my improved equipment, premium hops have been attained in every instance and, in most instances, the attained premium hops have been found to have less than one percent of foreign material intermingled therewith. The attained premium hops conveniently are caused to drop upon endless hop take-off conveyor 61 which is mounted for rotation below the lower end of the inclined surface 13, while the foreign material dropping through the slots 16 of the inclined surface 13 is deposited on a debris take-off conveyor 62 which is mounted for rotation below the inclined surface; such conveyors being schematically illustrated in Fig. 3 of the annexed drawings. To prevent foreign material which drops through the slots of the inclined surface near the lower end thereof from again intermingling with the freed hops, I mount a divider strip 63 on the frame members 11 and 12 adjacent to the lower end of the inclined surface 13, and dispose such divider strip at an incline so as to guide the foreign material onto the debris conveyor 62. In order to avoid loss of freed hops after rolling down the inclined surface 13, I tack or otherwise secure a drag-strip 64, preferably fabricated of canvas, to the under surface of divider strip 63 so as to lie adjacent to the hop take-off conveyor 61; such canvas drag-strip 64 serving to confine the movement or dropping of the freed hops onto the endless take-off conveyor 61.

Another application of my improved separating device to hop-picking machines is schematically illustrated in Fig. 7 of the annexed drawings. In this view, I have shown a portion of certain hop separating equipment for which Letters Patent No. 2,376,128 was heretofore granted to me. This previously patented equipment includes a trommel, designated generally in the drawings by the reference numeral 66, into which picked hops together with fragments of vines, leaves and stems are discharged from an elevating conveyor 67. The mixtures of individual picked hops and such foreign material are deposited on a driven screen 68 of the trommel unit and considerable amounts of vine fragments, leaves, leaf fragments and large stems are screened out for discharge onto a debris conveyor, not shown. Individual hops, together with quantities of foreign material pass through the mesh of screen 68 gravitate downwardly onto discharge chute 69 of the trommel unit falling upon the upper reach of an inclined endless screen conveyor 71 which is rotatably mounted below the trommel 66 in suitable bearings, not shown, on a framework 72. The conveyor 71 is driven in a counter-clockwise direction and hops deposited on the upper reach of such conveyor roll down the incline while some of the foreign material is carried over the top thereof to fall upon an imperforate barrier sheet 73 which is supported at an inclination to the vertical and which guides the separated foreign material downwardly onto a debris conveyor 74.

The freed individual hops, together with some foreign material intermingle therewith, which is discharged from the lower end of conveyor 71 and drop onto a sharply inclined endless screen conveyor 76 and from such conveyor onto the inclined slotted surface 13 of my improved separating equipment which has hereinabove been described, with the cleaned or premium hops being discharged from the inclined slotted surface 13 onto the endless belt conveyor 61 and from there to sacking equipment, not shown. During the movement of the mixtures of foreign material and hops on the inclined endless screen conveyors 71 and 76, the mixtures are subjected to currents of air blown through the screens from a fan 77 mounted on a structural member 78 on the opposite side of the framework. Portions of the air stream are directed in a straight line against the intermediate screen conveyor 76 to blow foreign material therethrough against the barrier sheets 73 to fall therefrom into the debris conveyor 74, and portions of the air stream from the fan 77 are directed upwardly by a deflector 79 towards the conveyor 71 to assist the discharging of foreign material over the top of such conveyor and onto the barrier sheet 73.

While I have made rerefence herein to certain hop separating devices in conjunction with which my improved separating equipment can be operated, and have illustrated schematically such hop separating devices, it is to be understood that I am not to be limited to the exemplifications illustrated and described, inasmuch as my improved separating equipment is equally adaptable for use in conjunction with any other type of separating device forming a part of any hop-picking machine. In most hop-picking machines, the hop separating devices are arranged contiguous to the hop-picking portions of the equipment and operate in conjunction therewith; it being well known to those skilled in the art that the mixtures of individual hops and foreign material intermingled therewith are in continuous motion during the operation of any hop-picking machine with the mixtures continuously being fed to the hop separating devices through which they are passed continuously and the foreign material separated from the individual hops to an extent commensurate with the effectiveness of the particular hop separating units, in order to attain as clean hops as is possible, and such separated hops are in continuous motion after passing through the separating equipment until delivered to the sacking device where the clean hops are sacked. With my improved equipment associated with any one or more of the various hop separating devices in use with hop-picking machines, hops can be cleaned to an extent that the percentage of foreign material remaining with the cleaned hops does not exceed one percent of any given quantity of cleaned hops. This reduction of the amount of foreign material remaining with the cleaned hops is of considerable economic value in view of the increased prices paid by brewers for hops containing less than a specified percentage of foreign material, and the low cost of production and installation of my improved equipment warrants the combination thereof with hop separating devices already in use.

It is believed that the hereinabove described method of recurrently combing moving quantities of mixtures of individual hops and foreign material to free the hops from the foreign material and permit the same to roll down an incline onto a take-off conveyor while simultaneously freeing the foreign material sufficiently to permit the same to fall through the slots of the slotted inclined surface described has not been heretofore followed or practiced in the art. A preferred construction of inclined surface 13, which has actually been tested and found highly effective, affords slots 16 which are approximately three-eighths of an inch in width. In such surface, which I have constructed to a width of approximately 4½ feet and to a length of approximately 5 feet, I provide 68 rods 14 of circular cross-section each having a diameter of three-eighths of an inch and I have arranged these rods and have so connected them to the cross-member 17 that they lie in substantially parallel relationship lengthwise of the surface 13 and are so spaced apart that the measurement from center to center of adjacently disposed rods is approximately three-quarters of an inch. Because of the thus afforded narrow slots 16, substantially all of the individual hops freed from the foreign material on the inclined surface 13 will roll down such surface and be received on take-off conveyor 61 with only a relatively few very small hops passing through the three-eighths inch wide slots 16 along with the foreign material. Because of the round rods 14, foreign material such as vine fragments, leaves and fragments thereof as well as hop stems, readily will slide laterally and obliquely over the rounded exterior surfaces of the rods 14 into and through the slots 16. If rods of rectangular cross-section were to be employed in the place and stead of the round rods 14, it is advisable to bevel the lateral edges of such substituted rods as the bevelled lateral edges will enhance the sliding action, laterally and obliquely, of all of the foreign material towards and into and through the slots 16.

The herein disclosed method of recurrently combing mixtures of individual hops and foreign material while moving down an inclined surface is believed unique with applicant, and such method effectively prevents the matting or bunching of the individual hops with masses of foreign material which otherwise would occur but for the recurrent combing action provided for in my improved method and my improved equipment for separating or freeing individual hops from foreign material. This recurrent combining of these moving mixtures of foreign materials and intermingled hops affords effective periodic and recurrent sifting and breaking up of masses or bunches of the mixtures which, in the normal operation of hop-picking machines, are continuously deposited at the upper end of an inclined surface. No further cleaning of the hops after passing over the inclined slotted surface 13 and after mixtures of the hops and foreign material have been subjected to recurrent combing action, need be carried out since my improved method and equipment reduces to a minimum the amount of foreign material remaining in any given quantity of stripped and cleaned hops.

It is to be understood that the appended claims are to

I claim:

1. Apparatus for separating hops from foreign material comprising a frame disposed at a steep incline to the horizontal, a transversely arranged cross-bar spanning the top of said frame, a plurality of rods secured at their one ends to and suspended from said cross-bar transversely of said frame for arrangement in substantially parallel spaced relationship to define a multi-slotted steeply inclined surface of alternate rods and slots; said rods being unsecured at their other ends and said multi-slotted inclined surface being adapted to receive moving mixtures of hops and foreign material and permitting movement of said mixtures downwardly of said inclined surface, a plurality of comb elements consisting of alternate teeth and notches extending transversely of said frame in underlying relationship to said rods and supporting and maintaining said rods in substantially parallel arrangement one to the other in the notches of said comb elements with the teeth of said comb elements projecting above said multi-slotted steeply inclined surface for engaging the mixtures of hops and foreign materials and for sifting the same, and means for moving said comb elements recurrently in the direction of moving mixtures of hops and foreign material down said steeply inclined multi-slotted surface to separate hops from said mixtures thereby to permit the separated hops to move down and off said steeply inclined surface and the separated foreign material to drop through the slots of said multi-slotted surface.

2. Apparatus as defined in claim 14, and means disposed adjacent to the top of said frame for moving mixtures of hops and foreign material onto said multi-slotted steeply inclined surface.

3. Apparatus as defined in claim 15, and means disposed adjacent to the bottom of said frame for receiving and moving away therefrom separated hops moving down and off said multi-slotted steeply inclined surface.

4. Apparatus for separating hops from foreign material comprising a frame disposed at a steep incline to the horizontal, a transversely arranged cross-bar spanning the top of said frame, a plurality of rods secured at their one ends to and suspended from said cross-bar transversely of said frame for arrangement in substantially parallel spaced relationship thereby defining a multi-slotted steeply inclined surface of alternate rods and slots; said rods being unsecured at their other ends and said multi-slotted inclined surface being adapted to receive moving mixtures of hops and foreign material and permitting movement of said mixtures downwardly of said inclined surface, means for positioning, supporting and maintaining said rods in substantially parallel arrangement to maintain the sizes of the slots therebetween substantially uniform throughout the entire extent of said surface and for disrupting and sifting the moving mixtures of hops and foreign material disposed on said inclined multi-slotted surface and for augmenting the gravitational movement of the mixtures down said surface and for pulling through the slots of said surface at its lower end any accumulation of foreign material thereby to prevent clogging of the surface, said means comprising a plurality of comb elements consisting of alternate teeth and notches extending transversely of said frame in underlying relationship to said rods and supporting said rods in the notches of said comb elements with the teeth of said comb elements projecting above said multi-slotted steeply inclined surface for engaging the mixtures of hops and foreign material and sifting the same to separate individual hops from the mixtures, and means for moving the said comb elements recurrently in the direction of moving mixtures of hops and foreign material down said steeply inclined multi-slotted surface to cause the separation of hops from the mixtures and permit the separated hops to move down and off said steeply inclined surface and the separated foreign material to drop through the slots of said multi-slotted surface.

References Cited in the file of this patent

UNITED STATES PATENTS

| Number | Name | Date |
|---|---|---|
| 192,013 | Robertson | June 12, 1877 |
| 255,100 | Cook | Mar. 21, 1882 |
| 376,229 | Binkley | Jan. 10, 1888 |
| 1,052,249 | Hewitt | Feb. 4, 1913 |
| 1,377,399 | Conte | May 10, 1921 |
| 1,673,337 | McGaughey | June 12, 1928 |
| 2,295,190 | Zenge et al. | Sept. 8, 1942 |
| 2,420,941 | Fies | May 20, 1947 |

FOREIGN PATENTS

| Number | Country | Date |
|---|---|---|
| 282,176 | Great Britain | Dec. 22, 1927 |
| 745,260 | Great Britain | Feb. 22, 1956 |

UNITED STATES PATENT OFFICE
CERTIFICATE OF CORRECTION

Patent No. 2,983,380            May 9, 1961

Florian F. Dauenhauer

It is hereby certified that error appears in the above numbered patent requiring correction and that the said Letters Patent should read as corrected below.

Column 7, line 32, for the claim reference numeral "14" read -- 1 --; line 36, for the claim reference numeral "15" read -- 2 --.

Signed and sealed this 3rd day of October 1961.

(SEAL)
Attest:

ERNEST W. SWIDER
Attesting Officer

DAVID L. LADD
Commissioner of Patents

USCOMM-DC